Oct. 31, 1961  R. T. ELLIS  3,007,158
APPARATUS FOR EXTENDING THE RANGE OF RADAR
Filed Sept. 30, 1954
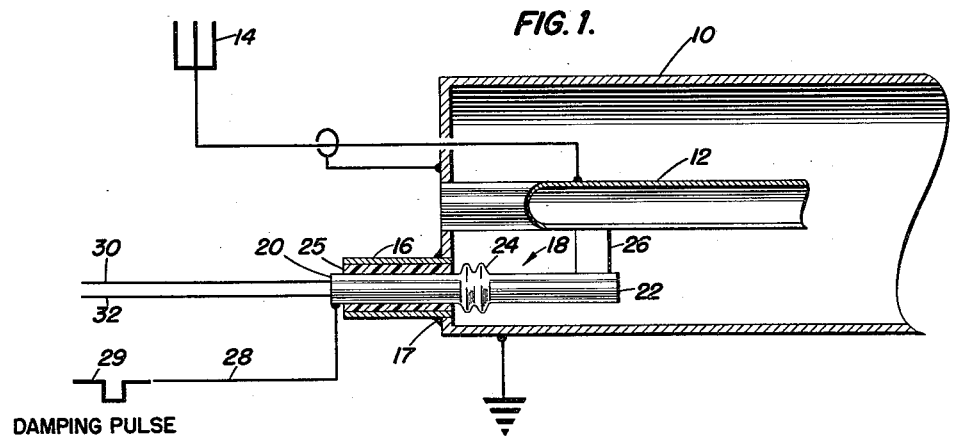
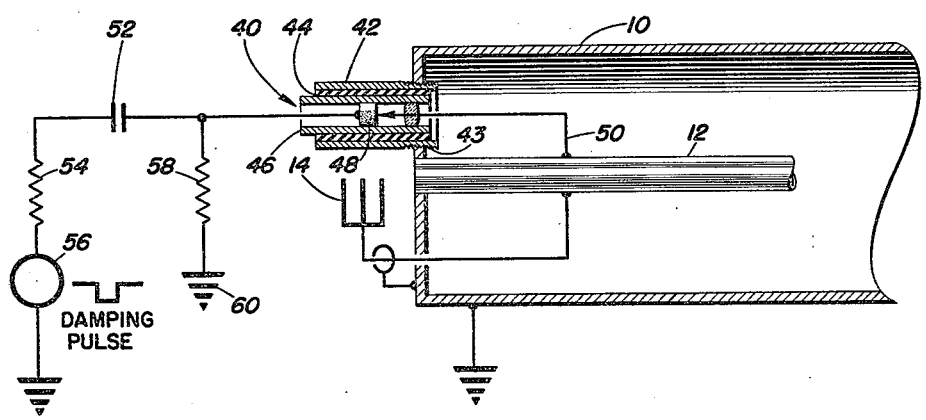
INVENTOR
RICHARD T. ELLIS
BY
ATTORNEYS

3,007,158
APPARATUS FOR EXTENDING THE RANGE OF RADAR
Richard T. Ellis, Silver Spring, Md., assignor to the United States of America as represented by the Secretary of the Navy
Filed Sept. 30, 1954, Ser. No. 459,571
1 Claim. (Cl. 343—13)

This invention relates generally to radar apparatus, and more particularly to means for extending the minimum range of a pulse type radar apparatus.

In some applications it is necessary that the minimum range of a radar apparatus be extended so that ranging can be accomplished when short distances are involved. This is true when the radar is being used as a special purpose altimeter or in any similar application where it is desired to reduce the minimum range to 100 feet or less. Ordinary pulse type radar apparatus cannot be used down to this range because the transmitted pulse masks the echo pulse.

Accordingly, it is an object of this invention to provide means for effectively reducing the output of the oscillator of a radar apparatus so that an echo pulse can be detected when the distance to a reflecting object is extremely short.

It is a further object of the invention to provide means for effectively damping the output of a cavity type oscillator so that the minimum range of a pulse type radar apparatus can be reduced.

Other objects and many of the attendant advantages of this invention will be readily appreciated as the same becomes better understood by reference to the following detailed description when considered in connection with the accompanying drawing, wherein:

FIG. 1 is a diagrammatic illustration of one embodiment of the invention; and

FIG. 2 is a diagrammatic illustration of a second embodiment of the invention.

Briefly, the invention resides in providing a loading loop coupled to a cavity oscillator. The loop includes a diode that is made conductive by pulses to change the loading of the cavity oscillator thereby damping its output.

The embodiment of the invention shown in FIG. 1 comprises a cavity resonator 10 provided with a post 12. It will be understood that a lighthouse tube or other suitable high frequency oscillator tube is associated with the cavity resonator 10 in a manner well known to those skilled in the art. An antenna 14 is coupled to the cavity resonator 10 to transmit and receive electromagnetic energy. A sleeve 16, of suitable inside diameter to receive a high frequency vacuum tube diode indicated at 18, is soldered or otherwise attached at 17 to the cavity resonator 10. The high frequency diode 18 includes a cathode 20 and an anode 22, both in the form of metallic cylinders, separated by an insulator 24. The diode 18 is inserted into the sleeve 16 on the cavity resonator 10, the cathode 20 being spaced from the sleeve 16 by an insulating material 25, thereby providing an R.F. bypass between the cavity resonator 10 and the cathode 20. The anode 22 of the diode 18 is connected to the post 12 by a conductive strap 26 which may be brass foil. A damping pulse is supplied to the cathode 20 by a connection 28 from a source 29 in FIG. 1. Heater connections for the cathode 20 of diode 18 are shown at 30 and 32.

In a second embodiment of the invention, shown in FIG. 2, a germanium crystal diode 48 is substituted for the vacuum tube diode of FIG. 1. The germanium crystal diode 40 is carried in a metallic sleeve 42 that is provided with external threads 43 so that it can be screwed into an aperture provided in the cavity resonator 10. A sleeve insulator 44 is interposed between the sleeve 42 and the shell 46 of the diode to provide an R.F. bypass connection to the cathode of the crystal diode 48. The anode of the germanium crystal 48 is connected to the post 12 by a strap 50. The cathode of the crystal diode 48 is connected through a capacitor 52 and a load resistor 54 to a source of pulses 56.

The combination of the capacitor 52 inserted in series in the cathode and a resistor 58 connected between the cathode and ground 60 is employed to adjust the bias on the crystal diode 48. It is to be noted that the pulse source 56 and bias arrangement described in connection with FIG. 2 can be used in the embodiment of FIG. 1.

In the operation of either embodiment of the invention, the diodes 18 or 48 are pulsed and become conductive. The conducting loop including the diode, the strap connecting the diode to the post 12, the cavity resonator 10, and the R.F. bypass is coupled to the cavity resonator 10 thereby changing the loading on the oscillator. This results in the output of the oscillator being damped so that an echo pulse is not masked by the ringing of the cavity after the modulator pulse is complete, when the distance to a reflecting object is very short.

Obviously many modifications and variations of the present invention are possible in the light of the above teachings. It is therefore to be understood that within the scope of the appended claim the invention may be practiced otherwise than as specifically described.

What is claimed is:

The combination with a pulse type radar system having a transmitter including an antenna adapted both for transmitting and receiving energy and a cavity resonator connected to said antenna, of an apparatus for increasing the useful range of said radar system comprising, a loading loop coupled to said resonator, said loading loop including a high vacuum diode, and means including a damping pulse for causing said diode to become conductive thereby for dissipating the residual energy of the cavity resonator, said diode being capable of returning immediately to a non-conductive state in order that said resonator will be restored to resonant condition immediately after cessation of a transmitted pulse, whereby a decaying portion of said pulse will not mask the echo pulse at short ranges.

References Cited in the file of this patent

UNITED STATES PATENTS

| | | |
|---|---|---|
| 2,439,651 | Dome | Apr. 13, 1948 |
| 2,592,551 | Flarity | Apr. 15, 1952 |
| 2,647,240 | Todd | July 28, 1953 |
| 2,654,834 | Zarky | Oct. 6, 1953 |